C. T. BYERLEY.
RETREADING VULCANIZER.
APPLICATION FILED MAR. 10, 1919.
1,356,597.
Patented Oct. 26, 1920.
Fig. I.
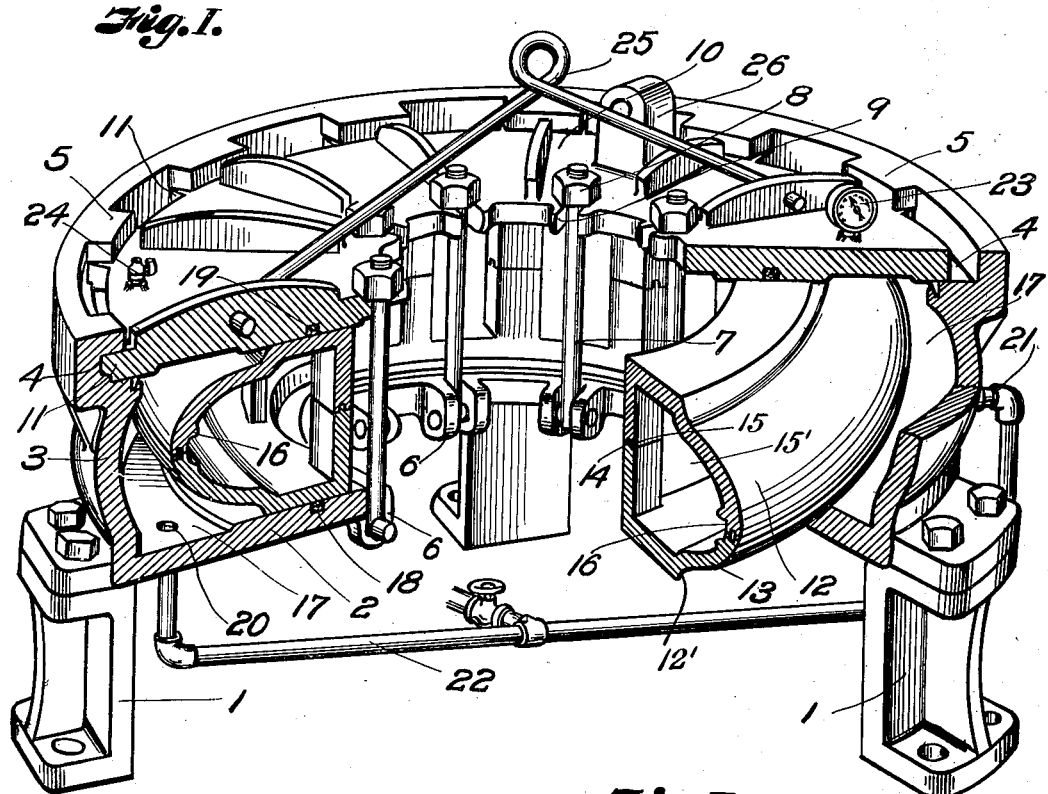
Fig. II.
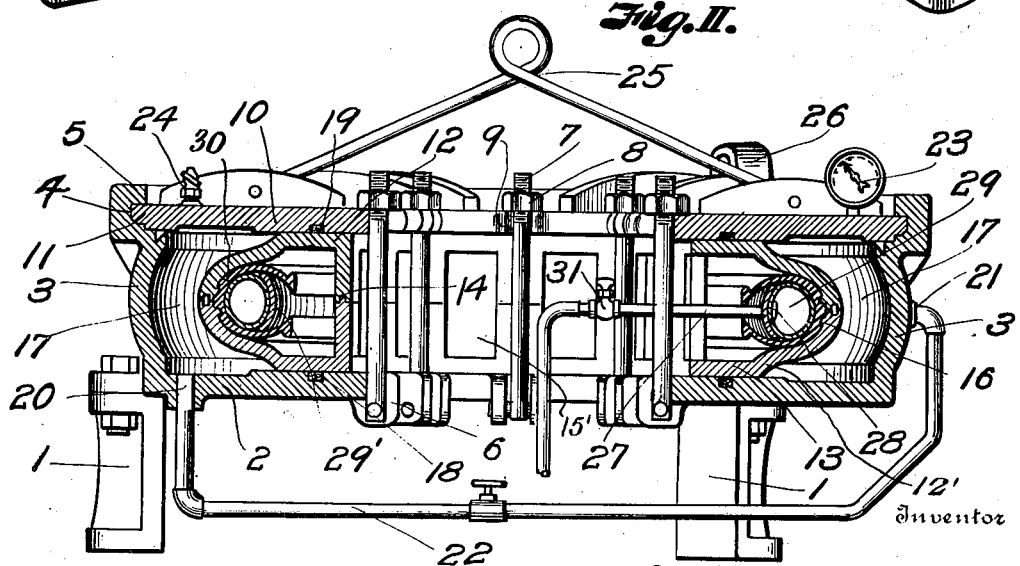
Inventor
Carlous T. Byerley.
By
Attorney

UNITED STATES PATENT OFFICE.

CARLOUS T. BYERLEY, OF KANSAS CITY, MISSOURI.

RETREADING-VULCANIZER.

1,356,597. Specification of Letters Patent. Patented Oct. 26, 1920.

Application filed March 10, 1919. Serial No. 281,732.

*To all whom it may concern:*

Be it known that I, CARLOUS T. BYERLEY, a citizen of the United States, residing at Kansas City, in the county of Jackson and State of Missouri, have invented certain new and useful Improvements in Retreading-Vulcanizers; and I do declare the following to be a full, clear, and exact description of the invention, such as will enable others skilled in the art to which it appertains to make and use the same, reference being had to the accompanying drawings, and to the letters and figures of reference marked thereon, which form a part of this specification.

This invention relates to retreading vulcanizers for pneumatic tires and one of the objects thereof is to provide a vulcanizer having means for retreading a tire carcass. Tires, not infrequently, remain in good condition except for the natural wear and tear on the treads, it being obvious that by suitably applying a new tread to the carcass, the tire will be restored to its original condition and it is the purpose of my invention to provide means whereby the retreading can be expeditiously accomplished in an inexpensive manner and without injuring the sides and beads of the tire by submitting them to the vulcanizing temperature required to cure the new tread.

Another object of the invention is to provire a retreading vulcanizer provided with a tire tread matrix which may be constructed in sections to permit the same to be readily accessible for the introduction and removal of the tire from the vulcanizer.

Other objects and advantages of the invention will be referred to hereinafter, it being understood that changes in form, proportion and minor details of construction may be resorted to without departing from the spirit of the invention or sacrificing any of its advantages.

In the drawings,

Figure I is a view partly in perspective and partly in section of a vulcanizer constructed in accordance with my invention, and Fig. II is a vertical longitudinal sectional view through the same.

Referring now to the drawings by numerals of reference:

1 designates a plurality of standards or legs upon which the vulcanizer base is supported. The base 2 comprises a circumferential or ring-shaped member provided at its perimeter with an upstanding outer wall 3 provided with an annular groove 4 at its upper inner edge, the said groove being overlapped by a plurality of spaced inwardly projecting securing lugs 5. On the inner edge of the member 2 is a plurality of bearing brackets 6 spaced equal distances apart and receiving the pivoted clamping bolts 7 threaded at their upper ends to receive the clamping nuts 8. These bolts are adapted to engage notches or slots 9 in the inner edge of a cover member 10 which is provided with peripherally disposed lugs 11, adapted to engage under the lugs 5, as will be presently explained.

The outer edge of the cover 10 may rest upon the floor of the groove 4 while the inner edge is supported by the matrix which receives the tire for the purpose of retreading it. The matrix is shown as comprising two substantially semi-tubular sections 12 and 13 having tongue and groove sections as indicated at 14 and 15 and the inner periphery of the sections having openings 15' for admitting the atmospheric air to reach the parts of the tire not being vulcanized and having a reduced offset portion 12' conforming in part to a tire with the retreading portion of the matrix properly designed to suit any form of tread. The portion 16 may have any design on its inner face so that when the tread is applied to the tire carcass the outer surface thereof will partake of the form or design intended.

By reference to Figs. I and II it will be observed that the matrix is clamped by the members 2 and 10 and that it constitutes the inner wall of a chamber 17, the bottom, side and top of the chamber comprising the members 2, 3 and 10 respectively. For the purpose of making the chamber 17 tight, suitable packing strips 18 and 19 may be provided between the matrix and the floor, and the top of the base or casing. The chamber 17 is adapted to be supplied with steam, as at 20 and 21, through the medium of a pipe 22 and in order to determine the amount of pressure in the chamber 17, I have provided a pressure gage 23 which is carried by the top 10 and which communicates with the chamber 17 in a well understood manner. In order that the pressure of the steam in chamber 17 may be relieved if necessary, I have provided a pet-cock 24 which may be manually operated.

25 is a bail secured to the top or cover 10 whereby the same may be lifted from the machine when it is desired to have access to the matrix. A lug 26 is provided on the cover 10 so that a suitable tool may be introduced therein to give a partially rotative movement to the cover to lock the lugs 11 under the lugs 5 when the vulcanizer is to be put in operation or to move them out of engagement with the lugs 5 when it is desired to remove the cover 10. 27 is an air pipe having a nozzle 28 which discharges into an annular expansible air bag 29 which is adapted to bear against the inner face of the tire carcass 30 to press the tread of the tire against the portion 16 of the matrix, and against abutment 29'.

Assuming that it is desirable to retread a tire, the carcass is first relieved of the old tread and new material is applied in the place thereof, and then the tire is inserted in the matrix with the air bag bearing against the inner face thereof, forcing the tread within the matrix, thus submitting only that part of the tire that is to be retreaded to vulcanizing temperature, as will be clearly seen by reference to Fig. II, the matrix bing clamped in place as shown in Figs. I and II. The valve 31 in the air pipe 27 may be opened to supply air to the air bag 29 to force the tire tread against the inner face of the portion 16 of the matrix so that the soft rubber will be impressed into the configuration on the inner face of the matrix. Steam may then be admitted into the heat chamber 17 through the pipe 22 to supply the necessary heat for curing the rubber comprising the tread. Steam will generally be admitted at a pressure of about fifty pounds and the tire may remain in the curing mold or matrix a sufficient length of time to permit the tread to be thoroughly cured. When the proper time has elapsed, the nuts 8 may be loosened, the clamping bolts swung down out of place, and the cover removed, after which the mold may be opened up to permit access to be had to the tire which may then be readily removed.

From the foregoing, it will be apparent that a vulcanizer constructed in accordance with my invention is inexpensive, durable and efficient and that it is well adapted to perform the functions for which it is intended.

Having thus described my invention, what I claim as new therein, and desire to secure by Letters-Patent is:

1. A retreading vulcanizer for tires comprising a matrix having a tread-receiving portion, an air bag in the matrix conforming to the inner shape of the tube to bear against the inner surface of the tire to force the tread only into engagement with the tread-receiving portion of the matrix, the side walls of the matrix diverging away from the bead and sides of the tire so that only the tread portion thereof will be treated, and means for supplying heat to the outer wall of the matrix.

2. A retreading vulcanizer for tires comprising a steam chamber and a matrix chamber, the walls of the matrix chamber conforming to the shape of the tread of the tire only, the steam chamber being about the periphery of the matrix chamber, and means for supplying steam to the steam chamber.

3. A retreading vulcanizer for tires comprising an outer closed steam chamber and an inner open matrix chamber, the outer wall of the matrix chamber constituting the inner wall of the steam chamber and conforming to the shape of the tread of the tire only, and means for supplying steam to the steam chamber.

In testimony whereof I affix my signature.

CARLOUS T. BYERLEY.